United States Patent [19]
Okayama et al.

[11] Patent Number: 5,448,039
[45] Date of Patent: Sep. 5, 1995

[54] BILLET INDUCTION HEATING DEVICE PROVIDING FAST HEATING CHANGEOVER FOR DIFFERENT SIZE BILLETS

[75] Inventors: Sakae Okayama; Yasuyuki Ikeda, both of Kawasaki, Japan

[73] Assignee: Fuji Electric Co., Ltd., Kanagawa, Japan

[21] Appl. No.: 112,063

[22] Filed: Aug. 26, 1993

[51] Int. Cl.$^6$ .............................................. H05B 6/42
[52] U.S. Cl. .................. 219/646; 219/656; 219/632; 219/674; 219/677; 219/676
[58] Field of Search ............. 219/646, 654, 656, 672, 219/674, 676, 677, 643, 662, 671, 632

[56] References Cited
U.S. PATENT DOCUMENTS

| | | | |
|---|---|---|---|
| 3,185,810 | 5/1965 | Peschel et al. | 219/656 |
| 3,535,485 | 10/1970 | Soworowski | 219/654 |
| 4,307,278 | 12/1981 | Lewis | 219/656 |

FOREIGN PATENT DOCUMENTS

| | | | |
|---|---|---|---|
| 54-134842 | 10/1979 | Japan | 219/656 |
| 1532594 | 10/1989 | U.S.S.R. | 219/656 |

*Primary Examiner*—Philip H. Leung
*Attorney, Agent, or Firm*—Finnegan, Henderson, Farabow, Garrett & Dunner

[57] ABSTRACT

In a billet induction heating device, a plurality of heating coil units having round holes different in diameter from one another are arranged in such a manner that the central axial lines of the round holes are in parallel with one another and are in a vertical plane, and moving means supports the heating coil units thus arranged. Whenever a billet is given which is different in size from the one which has been processed, among from the heating coil units one suitable for the given billet is selected, and the moving means is operated to move the heating coil units until the selected heating coil unit reaches the position where it can accommodate the given billet. This arrangement makes it possible to achieve the replacement of the heating coil unit quickly and readily.

2 Claims, 5 Drawing Sheets

PRIOR ART

PRIOR ART

BILLET INDUCTION HEATING DEVICE PROVIDING FAST HEATING CHANGEOVER FOR DIFFERENT SIZE BILLETS

BACKGROUND OF THE INVENTION

1. Field of the Invention

This invention relates to a billet induction heating device for heating a columnar metal billet by electromagnetic induction, which comprises a cylindrical heating coil member, billet holding means for holding a billet at one end face, and billet pushing means for pushing the other end face of the billet, and more particularly to an improvement of the billet induction heating device.

2. Discussion of the Related Art

A metal material which is shaped to obtain a metal member is called "billet". In general, billets are available in the form of cylinders different in diameter. In order to facilitate the shaping of a billet readily, the billet is heated before shaped. For this purpose, an induction heating method is employed. In the induction heating method, the billet is set in a cylindrical winding, and the latter is excited with AC current, so that an electromagnetic induction action occurs with the billet; that is, the cylindrical winding forms a magnetic field to cause current to flow in the billet thereby to generate Joule heat therein, so that the billet is heated by the Joule heat thus generated.

A conventional billet induction heating device is as shown in FIGS. 6 through 8. FIGS. 6(a) and 6(b) are a plan view and a front view, respectively, showing the arrangement of the billet induction heating device. FIGS. 7 and 8 show an electrical circuit and a cooling liquid circuit in the device, respectively.

In FIGS. 6(a) and 6(b), reference numeral 1 designates cylindrical billets; and 2, a heating coil unit. The heating coil unit 2 has a round hole 2' the diameter of which is slightly larger than the outside diameter of the billets 1. A polyphase cylindrical winding, which is cooled with liquid such as water, is wound on the heating coil unit 2. When necessary, the heating coil unit 2 is provided with an over-heating sensor. The polyphase cylindrical winding should have a cooling means to cool the billet which is at high temperature, and itself. For this purpose, the poly-phase cylindrical winding is generally formed by using a tubular conductor, or a so-called "hollow conductor", so that a cooling liquid is allowed to flow in it. That is, the polyphase cylindrical winding itself forms the cooling means.

Further in FIGS. 6(a) and 6(b), reference numeral 3 designates first reciprocating means including a movable body 3' which is moved in parallel with the axial line of the round hole 2'. In the case where the first reciprocating means is so designed as to be driven by air pressure, the movable body 3' is a piston, and a support 3 supporting the movable body 3' is a piston cylinder. Reference character 4' denotes an arm. One end portion of the arm 4 is coupled to the end of the movable body 3', and the other end portion is connected to billet holding means 4, which is columnar or cylindrical, so that the billet holding means is moved in parallel with the axial line of the round hole 2' as the movable body 3' moves. Reference numeral 5 designates a billet receiving stand having a plurality of conveying rollers on its upper surface for receiving billets heated. Reference numeral 6 designates second reciprocating means which is so designed that a movable body 6' is movable in parallel with the axial line of the round hole 2'. In the case where the second reciprocating means is so designed to be driven, for instance, by air pressure, the movable body 6' is a piston, and a support 6" supporting the movable body 6' is a piston cylinder. Reference character 7' denotes an arm. One end portion of the arm 7' is coupled to the end of the movable body 3', and the other end portion is connected to billet pushing means 7, which is columnar or cylindrical, so that the billet pushing means is moved in parallel with the axial line of the round hole 2' as the movable body 6' moves. Reference numeral 8 designates a billet receiving stand having a V-shaped groove in its upper surface for receiving a billet which is to be heated. The heating coil unit 2, the first reciprocating means 3, the receiving stand 5, the second reciprocating means 6, and the receiving stand 8 are mounted on a frame 25.

In FIG. 7, reference numeral 11 designates a flexible lead for supplying current to the polyphase cylindrical winding of the heating coil unit 2; 12, a phase leading capacitor; 13, a polyphase stepdown transformer; 14, an electromagnetic contactor for controlling the application of current to the heating coil unit 2; and 15, a power fuse for interrupting the supply of current when an electrical circuit including the heating coil unit 2 is, for instance, short-circuited.

In FIG. 8, reference numeral 18 designates flexible hoses for supplying a cooling liquid 17 to the cooling means of the heating coil unit 2; 26, pipes through which the cooling liquid is supplied; 19 and 19', a pair of manual valves for controlling the flow rate of cooling liquid 17 or for stopping the supply of cooling liquid 7 in replacing the heating coil unit 2; 19a and 19a', a pair of normally closed manual valves which are opened in an air blow operation which, in replacing the heating coil unit 2, is operated to remove the cooling liquid 17 from the pipes 26, the flexible holes 18, and the heating coil unit 2.

The conventional billet induction heating device designed as described above operates as follows:

With a billet 1 set in the round hole 2' of the heating coil unit 2, the electromagnetic contactor 14 is operated to supply current to the heating coil unit 2. In general, the current supplied to the heating coil unit 2 is large, several kilo-amperes (kA). In this operation, the billet holding means 4 holds the billet 1 at one end 1a thereby to prevent the latter from being sprung out of the round hole 2' by the movable magnetic field which is formed by the polyphase alternating current, and to maintain the billet at a position which is most suitable for the temperature distribution of the billet. When necessary, the billet holding means may be provided with a temperature sensor to directly detect the temperature of the billet. In this case, it can be detected with high accuracy when the temperature of the billet has reached a predetermined value. As is apparent from the above description, a considerably great electromagnetic force is applied to the heating coil unit 2 and the first reciprocating means. Therefore, it is necessary to rigidly secure the heating coil unit 2 and the first reciprocating means 3 to the frame 25.

When the temperature of the billet 1 reaches the predetermined value, the electromagnetic contactor 14 is opened to suspend the application of current, and the first reciprocating means 3 is operated to extend the movable body 3' outwardly thereby to pull the billet holding means 4 out of the round hole 2. When, under this condition, the movable body 3' is further extended, the arm 4' is turned being guided by a guide (not shown), so that the billet 1 becomes movable to the billet receiving stand 5. At the same time, the second reciprocating means 6 is operated to retract its movable body 6' thereby to cause the billet pushing means 7 to push the other end face 1b of another billet 1, which has been set on the billet receiving stand 8 so as to be heated, so that the billet 1 is inserted into the round hole 2' of the heating coil unit 2. As a result, the billet 1 which has been heated up is pushed out of the round hole 2' and set on the billet receiving stand 5. Thereafter, the movable body 3' is retracted so that the billet holding means 4 holds the billet 1 at one end face 1a; that is, the billet 1 becomes readily for heat treatment. Under this condition, the second reciprocating means operates to place another billet 1 on the billet receiving stand 8. The above-described operations are repeatedly carried out while the cooling liquid 17 is kept supplied to the heating coil unit.

In general, in the case where the diameter of the billet is changed; i.e., where a billet smaller in diameter is heated, the billet induction heating device suffers from the following difficulty: That is, the percentage of the magnetic field which is generated by the cylindrical winding to cross the billet is decreased; that is, the heating efficiency is lowered as much. In order to overcome this difficulty, a billet induction heating device has been proposed which comprises: a plurality of heating coil units the round holes of which are different in diameter; in other words, a plurality of heating coil units different in inside diameter, so that whenever the diameter of a billet to be heated is different from that of the preceding one, one of the heating coil units is selected which is most suitable for it. In the conventional billet induction heating device, replacing the heating coil unit is achieved through the following steps:

(1) The operator waits until the temperature of the heating coil unit to be replaced decreases to room temperature.

(2) The supply of cooling liquid is stopped by operating the manual valves. In this operation, the manual valves at the inlet and outlet of the cooling liquid flow path are closed so that the cooling liquid may not flow out.

(3) An air blow operation is carried out to remove the cooling solution from the cooling means of the heating coil unit and the flexible hoses.

(4) The flexible holes are disconnected from the heating coil unit.

(5) The flexible lead and the lead wire of the overheating sensor are disconnected from the heating coil unit.

(6) The bolts fastening the heating coil unit to the frame are removed.

(7) The heating coil unit is removed from the frame by lifting it with a hoist or the like.

(8) The heating coil unit thus removed is stored at a predetermined storing place.

(9) Another heating coil unit to be installed is received from the storing place, and is set on the frame by lifting it with a hoist or the like.

(10) The heating coil unit thus set is secured to the frame with the bolts.

(11) The lead wire of the over-heating sensor, and the flexible lead are connected to the heating coil unit thus secured.

(12) The flexible hoses are connected to the heating coil unit.

(13) The manual valves are opened to supply the cooling liquid to the heating coil unit.

As is apparent from the above description, replacing the heating coil unit includes a number of operating steps. Hence, the conventional billet induction heating device involves difficulties or problems that the replacement of the heating coil unit takes a lot of time and labor, and in the replacement, errors may occur with the electrical connection, and the flexible hoses may be insufficiently connected to the heating coil unit, and that it is necessary to provide a place to store a plurality of heating coil units for replacement.

SUMMARY OF THE INVENTION

Accordingly, an object of this invention is to eliminate the above-described difficulties or problems accompanying a conventional billet induction heating device.

More specifically, an object of the invention is to provide a billet induction heating device in which the heating coil unit used can be quickly and readily replaced with another one whose hole is suitable for a given billet.

The foregoing object and other objects of the invention have been achieved by the provision of a billet induction heating device comprising: a plurality of heating coil units having columnar holes different in size from one another for accommodating a billet therein, respectively, and a polyphase winding surrounding the columnar hole, each of the heating coil units including liquid cooling means in which the central axial lines of the columnar holes are in parallel with one another and are in a vertical plane; first reciprocating means with a movable part which is movable in parallel with the central axial line of the hole; billet holding means which is coupled to the movable part of the first reciprocating means, and adapted to hold a billet at one end face thereof which is being heated by electromagnetic induction; second reciprocating means with a movable part which is movable in parallel with the central axial line of the hole; and billet pushing means coupled to the movable part of the second reciprocating means, which, when a billet is to be accommodated in the hole, operates to push the other end face of the billet; and moving means for moving and holding one of the heating coil units which is selected to accommodate a given billet therein.

The device, according to the invention, further includes: electrical switching means which is electrically connected in series to the polyphase windings of the plurality of heating coil units, the electrical switching completing an electrical circuit for the heating coil unit thus selected.

The device further includes: flow path opening and closing means connected in series, as flow paths, to the liquid cooling means of the plurality of heating coil unit, the flow path opening and closing means supplying cooling liquid to the heating coil unit thus selected when the billet is subjected to induction heating.

The device further includes: bypass flow paths with flow rate adjusting means which are connected in parallel to the flow path opening and closing means, respectively.

With the billet induction heating device of the invention, the heating coil units different in inside diameter for accommodating billets different in diameter are replaced as follows: From among the heating coil units, one suitable for accommodating a given billet is selected. The heating coil unit thus selected is moved by the moving means to the position where it can receive the given billet, and then the electrical switching means is operated to complete the electrical circuit for the selected heating coil unit, and the flow path opening and closing means connected to the selected heating coil unit is opened while the remaining flow path opening and closing means connected the remaining heating coil units are closed, so that cooling liquid is supplied only to the selected heating coil unit. Thus, the replacement of the heating coil unit has been accomplished. In the heating coil unit replacing operation, it is unnecessary to disconnect the lead wires, the hoses, the heating coil unit and accordingly to connect them back, and, in addition, it is unnecessary to perform the air blow operation to remove the residual cooling liquid.

The nature, utility and principle of the invention will be more clearly understood from the following detailed description and the appended claims when read in conjunction with the accompanying drawings.

DETAILED DESCRIPTION OF THE PREFERRED EMBODIMENTS

Preferred embodiments of this invention will be described with reference to the accompanying drawings.

Figure 7:
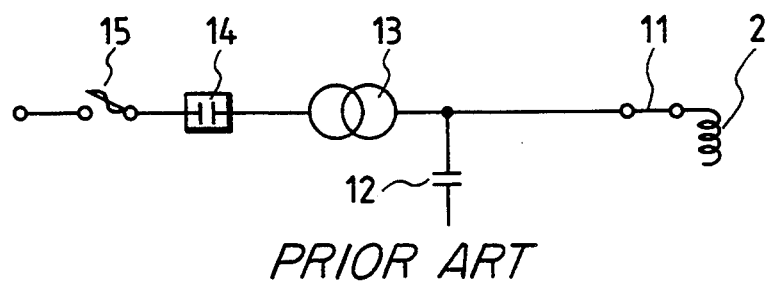
FIG. 7 is a circuit diagram showing an electrical circuit in the conventional billet induction heating device.
Figure 8:
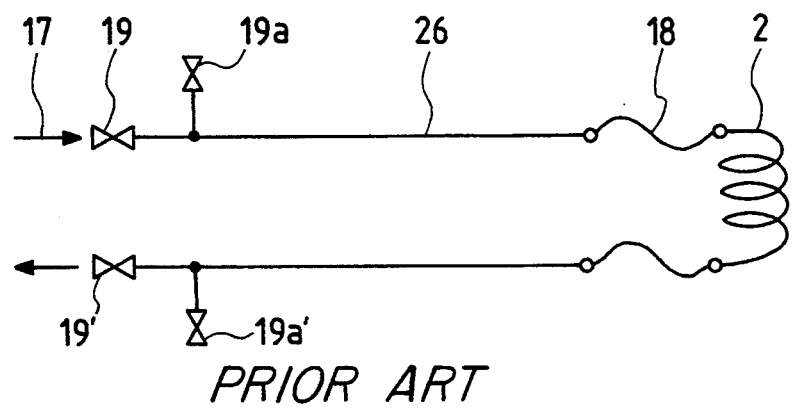
FIG. 8 is a diagram showing cooling liquid flow paths in the conventional device.
Figure 6A:
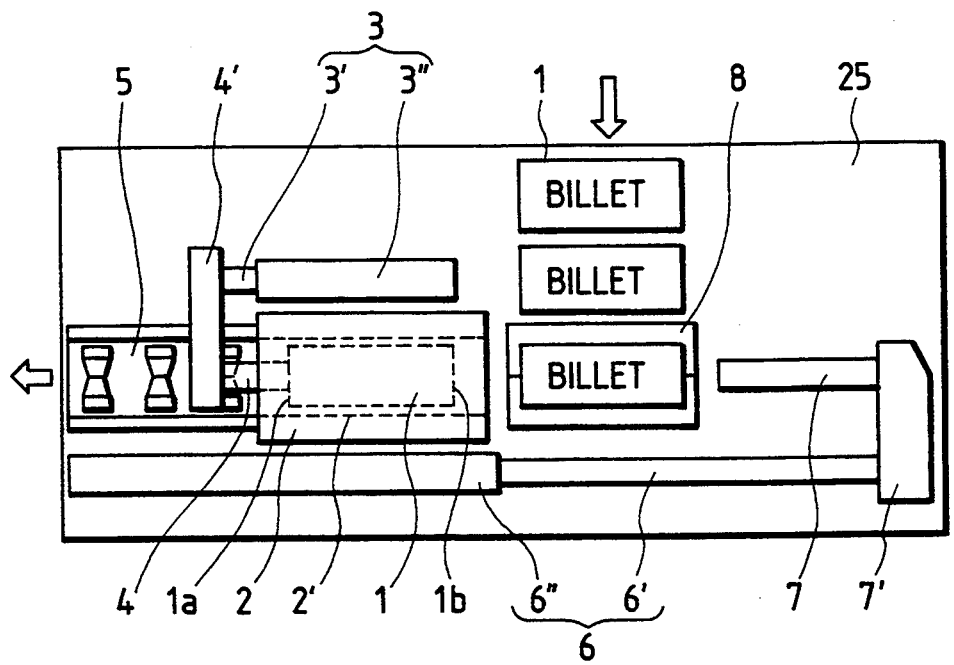
FIGS. 6(a) and 6(b) are a plan view and a front view, respectively, showing a conventional billet induction heating device.
Figure 6B:
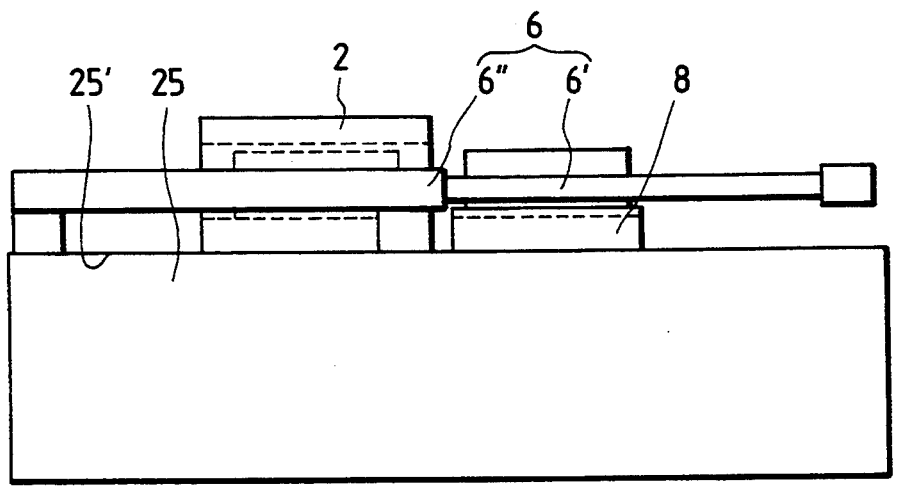

A billet induction heating device, which constitutes a first embodiment of the invention, will be described with reference to FIGS. 1 through 3, in which those components which have been described with reference to FIGS. 6 through 8 (showing the conventional billet induction heating device) are therefore designated by the same reference numerals or characters.

Figure 1A:
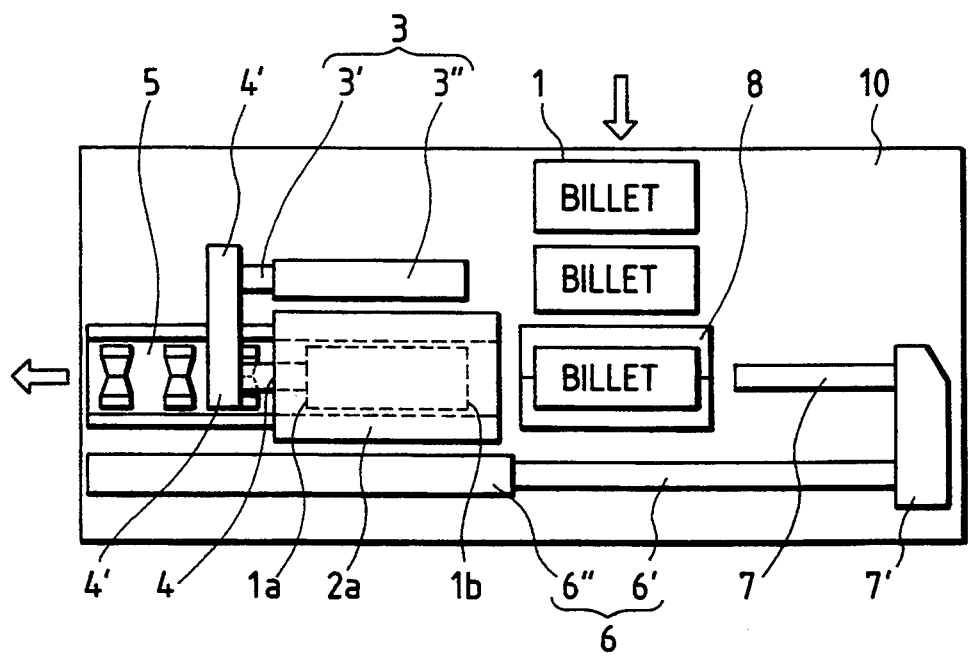
FIGS. 1(a) and 1(b) are a plan view and a front view, respectively, showing a billet induction heating device according to a first embodiment of this invention.
Figure 1B:
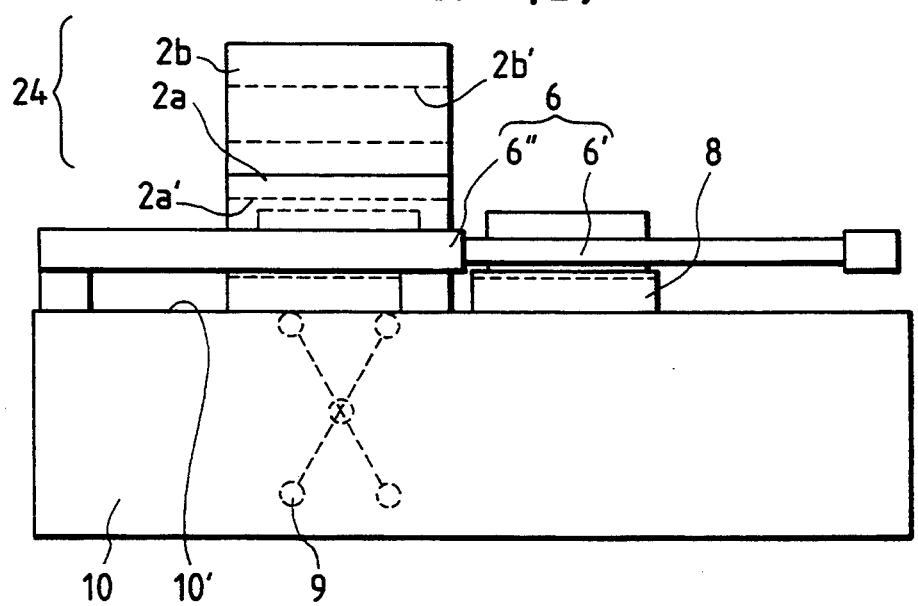

In FIG. 1, reference numeral 24 designates a heating coil unit group comprising a first heating coil unit 2a with a round hole 2a' and a second heating coil unit 2b with a round hole 2b' whose diameter is different from that of the round hole 2a' of the first heating coil unit 2a. The first and second heating coil units 2a and 2b are so arranged that the central axes of the round holes 2a' and 2b' are in parallel with each other, and are in a vertical plane. Reference numeral 9 denotes vertical moving means which fixedly supports the heating coil unit group 24 and is adapted to move vertically (in the embodiment) to allow either the first heating coil unit 2a or the second heating coil unit 2b to accommodate a billet 1 and hold it there with a stop pin or the like. Reference numeral 10 designates a frame. The first reciprocating means 3, the billet receiving stand 5, the second reciprocating means 6, and the billet receiving stand 8 are mounted on the upper surface 10' of the frame 10, and the vertical moving means 9 which fixedly supports the heating coil unit group 24 is provided below the upper surface 10'.

Figure 2:
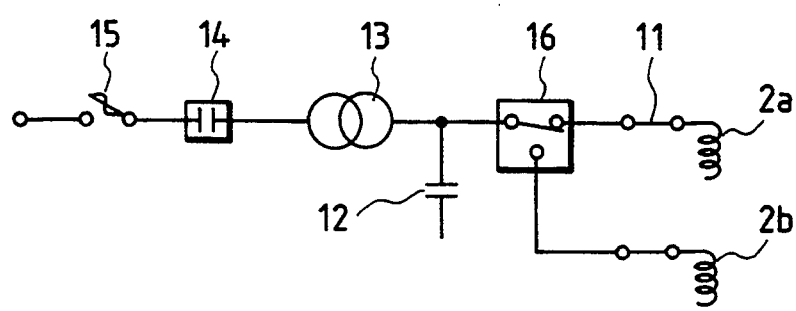
FIG. 2 is a circuit diagram showing an electrical circuit in the device of the invention.

In FIG. 2, reference numeral 16 designates electrical switching means such as a circuit breaker which is connected selectively to the polyphase cylindrical winding of the first heating coil unit 2a or the polyphase cylindrical winding of the second heating coil unit 2b to form an electrical circuit with one of the heating coil units which accommodates the billet 1. In FIG. 2, the electrical switching means is of single-pole double-throw type; however, it goes without saying that it may be formed by using two switches of single-pole single-throw type. A large current, several kilo-amperes (kA), is supplied through the electrical switching means 16. Therefore, the electrical switching means 16 is operated, for instance, with air pressure.

Figure 3:
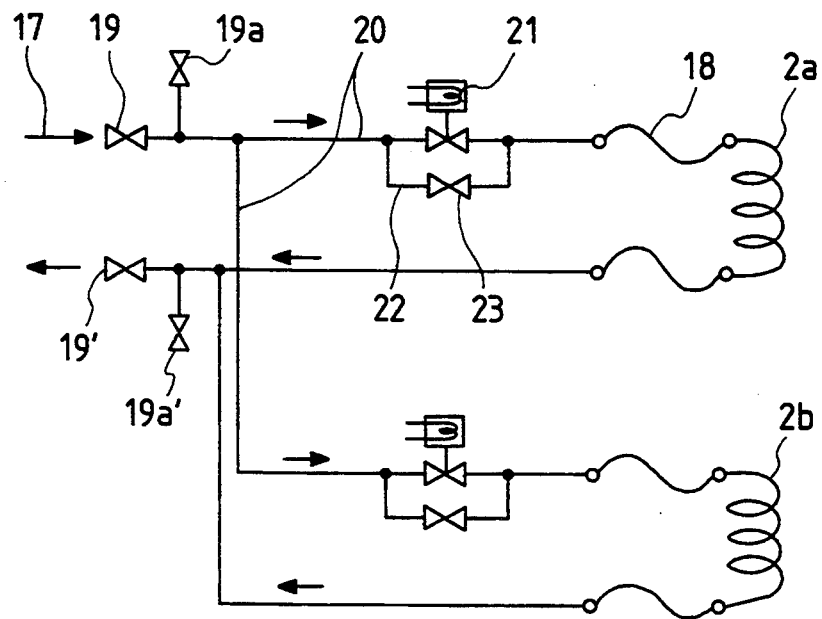
FIG. 3 is a diagram showing cooling liquid flow paths in the device of the invention.

In FIG. 3, reference numeral 20 designates pipes in which the cooling liquid flows. The pipes 20 form two flow paths respectively for the first and second heating coil units 2a and 2b. Reference numeral 21 designates flow path opening and closing means such as electromagnetic valves connected in series to the flow paths. Reference numeral 22 denotes bypass flow paths which are connected in parallel to the flow path opening and closing means 12, and have manual valves 23, respectively.

Replacing one of the first and second heating coils with the other will be described. For simplification in description, let us consider the case where the first heating coil unit has a billet 1 in it, and is to be replaced with the second heating coil. The vertical moving means 9 is operated to move the second heating coil unit to the position where it can receive a given billet, while the electrical switching means 16 is operated to complete the electrical circuit for supplying current to the second heating coil unit. In addition, one of the flow path opening and closing means 21 which is connected to the second heating coil unit is opened, and the other 21 connected to the first heating coil unit is closed. Although the other flow path opening and closing means 21 connected to the first heating coil unit has been closed, it is unnecessary to let the first heating coil unit stand until it is cooled down, because a small quantity of cooling liquid 17 is kept supplied through the bypass flow path 22 to the first heating coil unit.

A second embodiment of the invention will be described with reference to FIGS. 4 and 5, in which those components which have been described with reference to FIGS. 1 through 3 are therefore designated by the same reference numerals or characters.

Figure 4A:
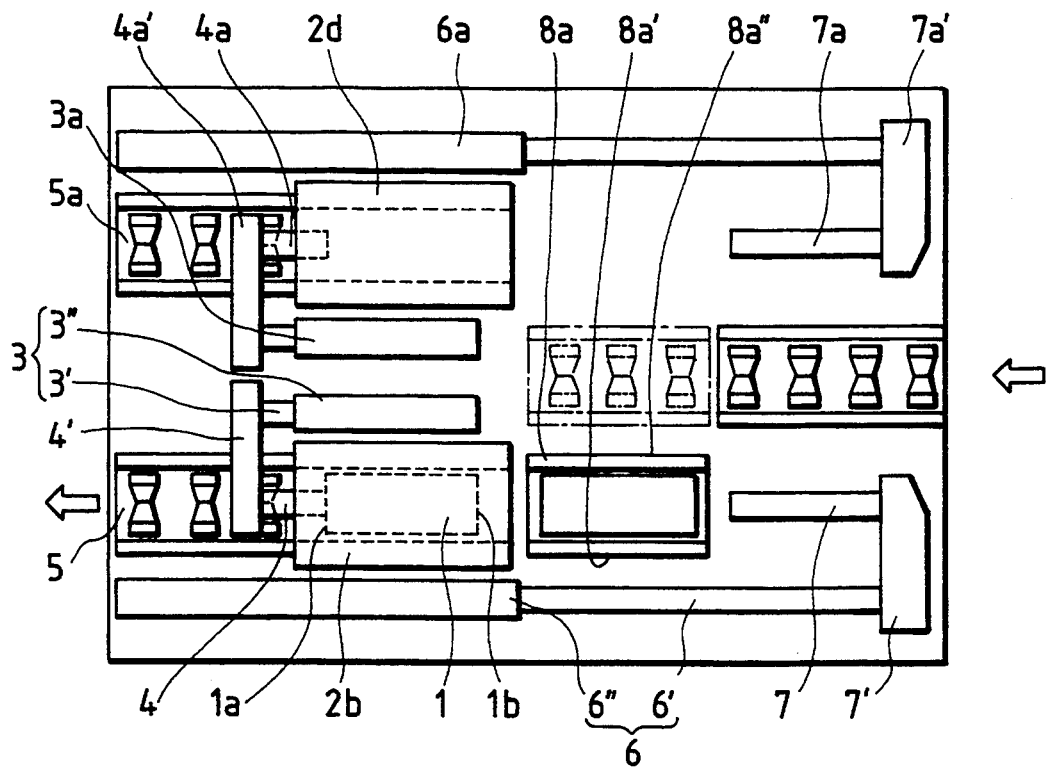
FIGS. 4(a) and 4(b) are a plan view and a front view, respectively, showing a billet induction hating device according to a second embodiment of the invention.
Figure 4B:
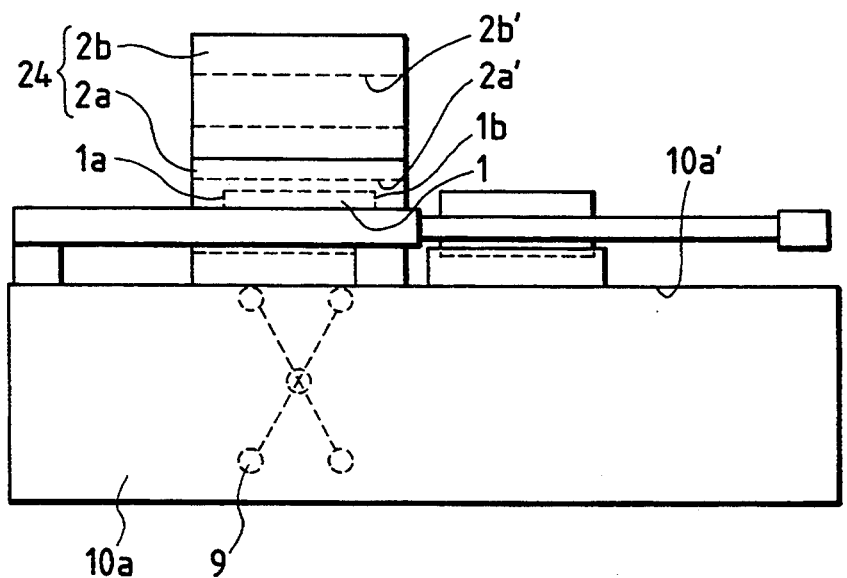
Figure 5:
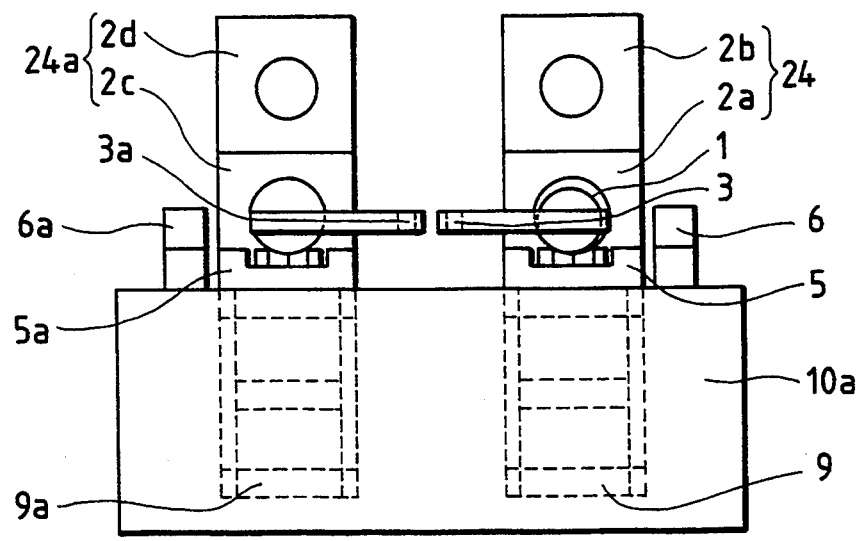
FIG. 5 is a side view of the device shown in FIG. 4.

In FIGS. 4 and 5, reference character 24a designates a heating coil unit group comprising a third heating coil unit 2c and a fourth heating coil unit 2d which are different in the diameter of the round hole not only from each other but also from the first and second heating coil units 2a and 2b. The third and fourth heating coil units 2c and 2d are fixedly arranged in such a manner that the central axial lines of the round holes are in parallel with each other, and are in a vertical plane. The heating coil units 2c and 2d thus arranged are secured to another vertical moving means 9a (hereinafter referred to as "second vertical moving means 9a", when applicable) provided in addition to the vertical moving means 9 (hereinafter referred to as "first vertical moving means 9", when applicable).

Similarly as in the heating coil unit group 24 (hereinafter referred to as "a first heating coil unit group 24", when applicable), the heating coil unit group 24a (hereinafter referred to as "a second heating coil unit group 24a", when applicable) is provided with first reciprocating means 3a, billet holding means 4a, an arm 4a', a billet receiving stand 5a, second reciprocating means 6a, billet pushing means 7a, and an arm 7a' which are similar to those provided for the first heating coil unit group.

Further in FIG. 4, reference character 8a designates a billet receiving stand which has a plurality of conveying rollers on its upper surface to receive billets to be heated. The billet receiving stand 8 conveys billets to the first heating coil unit group 24 or the second heating coil unit group 24a as follows: That is, the billet receiving stand 8 is moved to the selected one of the heating coil unit groups 24 and 24a being pushed through its respective side 8a' or 8a" by pushing means (not shown). In FIG. 4, reference character 10a denotes a frame.

In the above-described embodiments, each heating coil unit group includes two heating coil units; however, it should be noted that the invention is not limited thereto or thereby. That is, it goes without saying that each heating coil unit group may include more than two heating coil units. In this case, the electrical switching means 16 should be made up of single-pole single-throw switches the number of which is equal to the number of the heating coil units, and the number of the flow path opening and closing means 21 should be equal to the number of the heating coil units.

As was described above, the billet inducting heating device of the invention is made up of: a plurality of heating coil units whose columnar holes are different in size from one another; the moving means for moving and holding one of the heating coil units which is selected to accommodate a given billet therein; the electrical switching means electrically connected in series to the polyphase windings of the heating coil units, the electrical switching means completing an electrical circuit for the heating coil unit thus selected; the flow path opening and closing means connected in series, as flow paths, to the liquid cooling means of the plurality of heating coil unit, the flow path opening and closing means supplying cooling liquid to the selected heating coil unit thus in which a billet has been accommodated when the billet is heated by electromagnetic induction; the bypass flow paths connected in parallel to the flow path opening and closing means. With the billet induction heating device of the invention thus organized, the heating coil units having columnar holes different in size for accommodating billets different in size are replaced as follows: From among the heating coil units, one suitable for accommodating a given billet is selected. The heating coil unit thus selected is moved by the moving means to the position where it can receive the billet, and then the electrical switching means is operated to complete the electrical circuit for the selected heating coil unit, and the flow path opening and closing means connected to the selected heating coil unit is opened while the remaining flow path opening and closing means are closed. Thus, the replacement of the heating coil unit has been accomplished. In the heating coil unit replacing operation, it is unnecessary to disconnect the lead wires, the hoses, the heating coil unit, and accordingly to connect them again, and no air blow operation for removing the residual cooling liquid is required.

That is, the billet induction heating device of the invention has the following merits or effects: Whenever a billet is given which is different in size from the one which has been processed, the heating coil unit used can be quickly and readily replaced with another heating coil unit which is suitable for the given billet. In addition, it is unnecessary to provide a space for storing the heating coil units for replacement.

While there has been described in connection with the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A billet induction heating device comprising:

a plurality of heating coil units defining columnar holes which are different in size from one another for accommodating a billet, respectively, each of said plurality of heating coil units having a polyphase winding surrounding said columnar hole and liquid cooling means; said heating coil units being held in such a manner that the central axis lines of said columnar holes are in parallel with one another and are in a vertical plane;

first reciprocating means having a first movable part which is movable in parallel with the central axial line of said hole;

billet holding means which is coupled to said movable part of said first reciprocating means, for holding said billet at one end face thereof which is being subjected to induction heating;

second reciprocating means having a second movable part which is movable in parallel with the central axial line of said hole;

billet pushing means coupled to said second movable part of said second reciprocating means, for pushing the other end face of said billet when accommodating a billet in said hold;

moving means for moving and holding one of said plurality heating coil units which is selected to accommodate a given billet therein;

flow path opening and closing means connected in series, as flow paths, to said liquid cooling means of said plurality of heating coil units, said flow path opening and closing means supplying cooling liquid to said heating coil unit which is selected when said billet therein is subjected to induction heating; and flow rate adjusting means provided in bypass flow paths which are connected in parallel to said flow path opening and closing means, respectively.

2. A billet induction heating device as claimed in claim 1, further comprising:

electrical switching means which is electrically connected in series to said polyphase windings of said plurality of heating coil units, said electrical switching completing an electrical circuit for said heating coil unit which is selected.

* * * * *